(12) United States Patent
VanBlon et al.

(10) Patent No.: US 10,824,306 B2
(45) Date of Patent: Nov. 3, 2020

(54) PRESENTING CAPTURED DATA (71) Applicant: LENOVO (Singapore) PTE. LTD., New Tech Park (SG)

(72) Inventors: Russell Speight VanBlon, Raleigh, NC (US); Robert James Kapinos, Durham, NC (US); Scott Wentao Li, Cary, NC (US); Robert James Norton, Jr., Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 98 days.

(21) Appl. No.: 16/162,229

(22) Filed: Oct. 16, 2018

(65) Prior Publication Data
US 2020/0117325 A1 Apr. 16, 2020

(51) Int. Cl.
*G06F 3/0483* (2013.01)
*G06F 3/0482* (2013.01)
*G06F 3/01* (2006.01)
*G06K 9/00* (2006.01)
*G06F 40/279* (2020.01)

(52) U.S. Cl.
CPC ............ *G06F 3/0483* (2013.01); *G06F 3/013* (2013.01); *G06F 3/0482* (2013.01); *G06F 40/279* (2020.01); *G06K 9/00449* (2013.01)

(58) Field of Classification Search
None
See application file for complete search history.

(56) References Cited

U.S. PATENT DOCUMENTS

| | | | |
|---|---|---|---|
| 8,438,148 B1* | 5/2013 | Rakowski | G06F 16/90324 707/706 |
| 8,744,890 B1* | 6/2014 | Bernier | G06Q 10/0631 705/7.16 |
| 9,152,730 B2* | 10/2015 | Bignert | G06F 16/353 |
| 2007/0106952 A1* | 5/2007 | Matas | G06F 16/9577 715/764 |
| 2012/0166929 A1* | 6/2012 | Henderson | G06F 40/30 715/224 |
| 2012/0274552 A1* | 11/2012 | Takami | G06F 40/103 345/156 |
| 2016/0034029 A1* | 2/2016 | Lyons | H04L 67/06 715/748 |
| 2016/0299680 A1* | 10/2016 | Polyulya | G06F 3/04842 |

* cited by examiner

*Primary Examiner* — Tuan S Nguyen
(74) *Attorney, Agent, or Firm* — Kunzler Bean & Adamson (57) ABSTRACT

For presenting data captured from a first user interface while the user is looking at a second user interface, methods, apparatus, and systems are disclosed. One apparatus includes a processor and a memory that stores code executable by the processor. Here, the processor detects a switch from a first user interface to a second user interface and captures data from the first user interface. Additionally, the processor presents the captured data in the second user interface.

20 Claims, 7 Drawing Sheets

PRESENTING CAPTURED DATA

FIELD

The subject matter disclosed herein relates to electronic communications and more particularly relates to presenting data captured from a first user interface.

BACKGROUND

It can be difficult to input data from one application into another. The problem is particularly pertinent on handheld devices having small screens where it is hard to have windows side-by-side.

Although many mobile devices have operating systems that support split screen mode, this must be activated by the user (e.g., manually) and the user must exit the mode when done, regardless of the type or amount of information the user wishes to transfer. Moreover, split screen mode requires the user to navigate all windows of the split screens to find information in one window and input it into another. Further, many users are unaware that split screen mode or do not know how to use it effectively on various devices.

BRIEF SUMMARY

An apparatus for presenting data captured from a first user interface while the user is looking at a second user interface is disclosed. A method and computer program product also perform the functions of the apparatus.

One apparatus for presenting data captured from a first user interface while the user is looking at a second user interface includes a display, a processor, and a memory storing code executable by the processor. Here, the processor detects a switch from a first user interface to a second user interface and captures data from the first user interface. The processor detects that a user is inputting data within the second user interface and presents the captured data in the second user interface in response to detecting that the user is inputting data.

In certain embodiments, presenting the captured data includes presenting the captured data as an auto-fill suggestion. In other embodiments, presenting the captured data includes overlaying the captured data onto the second user interface. In such embodiments, the processor may further remove the overlay containing captured data in response to a dismissal action. In various embodiments, the dismissal action may be expiration of a predetermined amount of time, detecting that the user is not inputting the captured data, and/or detecting that the user looks away from the overlay.

In certain embodiments, detecting that the user is inputting data includes one or more of: determining that the user has selected an input field of the second user interface, and detecting that the user is typing. In certain embodiments, capturing data from the first user interface includes performing an optical character recognition routine on content within the first user interface.

In some embodiments, the apparatus further includes a camera that tracks an eye position of the user. In such embodiments, the processor determines an onscreen gaze location from eye position data. In certain embodiments, capturing data from the first user interface includes identifying content from a subsection of the user interface corresponding to the onscreen gaze location and capturing text corresponding to the identified content.

In certain embodiments, capturing data from the first user interface includes capturing data matching one or more predetermined formats. In certain embodiments, capturing data from the first user interface includes storing the captured data in a system-level digital clipboard.

One method for presenting data captured from a first user interface while the user is looking at a second user interface includes detecting, by use of a processor, a switch from a first user interface to a second user interface and capturing data from the first user interface. The method includes detecting, by use of a processor, that a user is inputting data within the second user interface and presenting the captured data in the second user interface in response to detecting that the user is inputting data.

In some embodiments, presenting the captured data includes presenting the captured data as an auto-fill suggestion. In other embodiments, presenting the captured data includes overlaying the captured data onto the second user interface. In such embodiments, the method may further include removing the overlay containing captured data in response to a dismissal action. In various embodiments, the dismissal action may be expiration of a predetermined amount of time, detecting that the user is not inputting the captured data, and/or detecting that the user looks away from the overlay.

In some embodiments, detecting that the user is inputting data includes one or more of: determining that the user has selected an input field of the second user interface, and detecting that the user is typing. In certain embodiments, capturing data from the first user interface includes performing an optical character recognition routine on content within the first user interface.

In some embodiments, the method further includes determining an onscreen gaze location from eye position data and identifying content from a subsection of the user interface corresponding to the onscreen gaze location. In such embodiments, capturing data from the first user interface may include capturing text corresponding to the identified content. In various embodiments, capturing data from the first user interface may include capturing data matching one or more predetermined formats.

One computer program product for presenting data captured from a first user interface while the user is looking at a second user interface includes a computer readable storage medium that stores code executable by a processor. In such embodiments, the executable code includes code to detect a switch from a first user interface to a second user interface and capture data from the first user interface. The executable code includes code to detect that a user is inputting data within the second user interface and present the captured data in the second user interface in response to detecting that the user is inputting data.

In some embodiments, detecting that the user is inputting data includes one or more of: determining that the user has selected an input field of the second user interface and detecting that the user is typing. In some embodiments, capturing data from the first user interface includes capturing data matching one or more predetermined formats.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a program product embodied in one or more computer readable storage devices storing machine readable code, computer readable code, and/or program code, referred hereafter as code. The storage devices are tangible, non-transitory, and/or non-transmission. The storage devices do not embody signals. In a certain embodiment, the storage devices may employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

For presenting data captured from a first user interface while the user is looking at a second user interface, methods, systems, and apparatuses are disclosed herein. When switching between multiple applications (e.g., each having its own window), the disclosed solution provides an option to 'scrape' text and/or image data from one or more previously viewed windows for display within a current window to make it easier for the user to see the data when interacting in multiple applications.

In one embodiment, an electronic device shows one of the previously viewed windows (or applications) transparently. For example, the device may display 'hovering' text of the previous window while the user inputs data into the current window. When switching windows, the device may keep the text visible from the previous window but not the entire window. In some embodiments, only the text/content from the previous window around the area the user was looking is kept visible. In another embodiment, the electronic device presents data from the previous window as one or more auto-fill suggestions.

In various embodiments, the device may keep the content (from the previous window) visible as long as the user is still looking at it (or looks back at it), while still typing information that matches it (keywords), etc. The electronic device may detect the user typing certain data formats, e.g., a 10 digit telephone number, and leave such data visible for user to retype. Alternatively, the device may consolidate the data matching the data format into a pop-up or a transparently overlaid notice.

In certain embodiments, the device may copy data that is looked at to a special system-level clipboard area could copy and make such data available for future applications to consume. In certain embodiments, data may be scraped from the previous window or application using OCR technology. In certain embodiments, an application may make its data available, such that it may potentially be requested by other apps, e.g., via public API.

In some embodiments, when the user starts inputting (e.g., typing) data, the device may determine whether the user is entering data that is seen/recognizable in another open window or document. If so, then the device may make that data easily accessible or viewable to the user. In one example, the device presents such data by overlaying matching text in the current window. In another embodiment, the device presents such data by generating a 'preview' window showing a portion of the other window/document having data matching that which the user 125 is entering. Moreover, there are embodiments where data is scraped from more than just the most recently used application/window.

In some embodiments, the device facilitates the comparison or analysis of data between pages. Here, the device may capture data on the previous window and display it in the current window, for example in response to the user switching from the previous window to the current window. In some embodiments, the device uses highlights or other visual cues to call attention to differences between the captured data and the data on the current page.

In some embodiments, the device automatically captures, from the previous window, specific types of data (e.g., data having a specific formats) in response to similar types of data being within the current window. In certain embodiments, the device uses eye tracking technology to capture data the user was looking at on the previous window. Thus, the device facilitates easy comparison of data between windows. Examples of types of data useful for comparison include, but are not limited to: price information, nutrition information, calorie information, contact information, vehicle specifications, computer specifications, phone specifications, transit times, transit schedules, class schedules, and the like.

Figure 1:
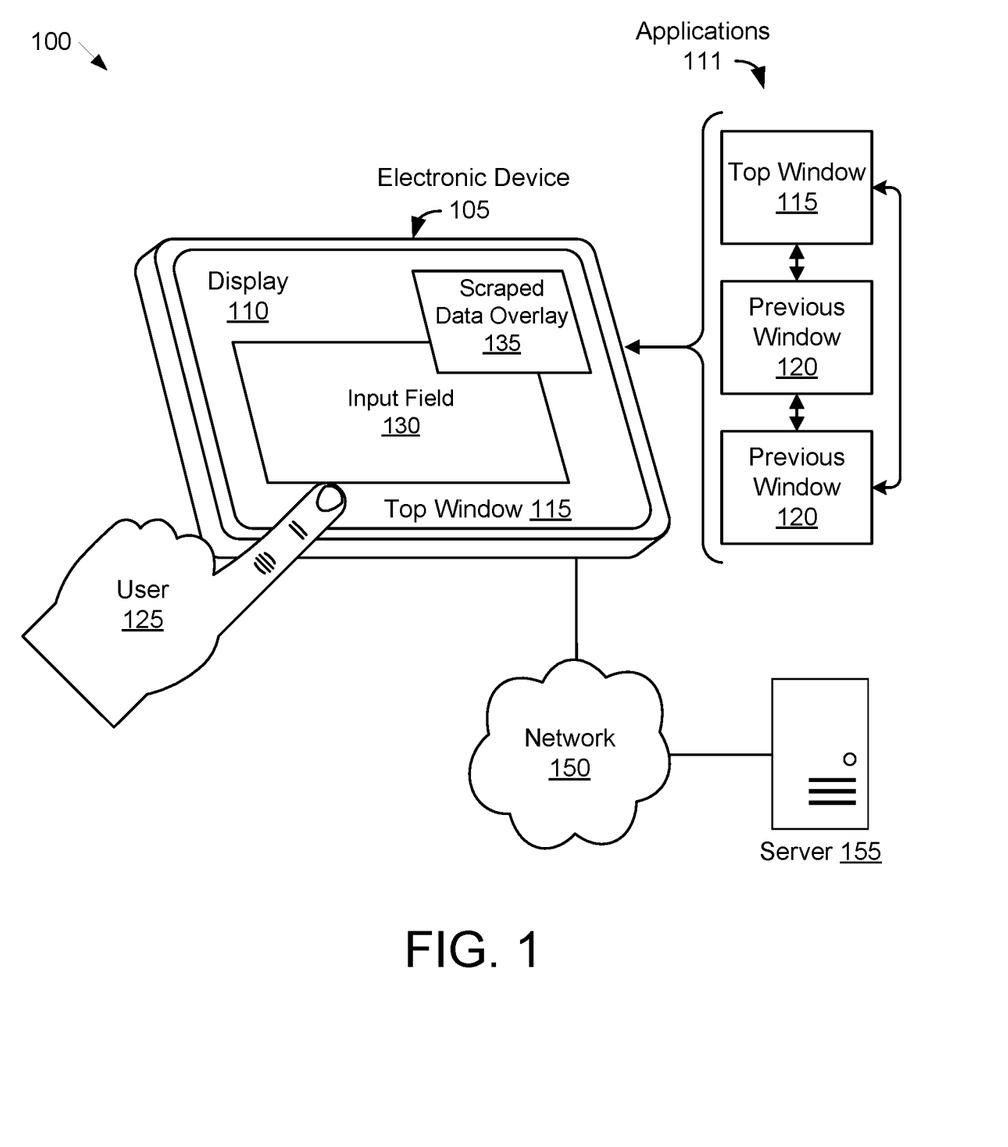
FIG. 1 is a schematic block diagram illustrating one embodiment of a system for presenting data captured from a first user interface while the user is looking at a second user interface.

FIG. 1 depicts a system 100 for presenting data captured from a first user interface while the user is looking at a second user interface, according to embodiments of the disclosure. The system 100 includes an electronic device 105 having a display 110 upon which various user interfaces ("UIs", e.g., 'windows') may be displayed. As depicted, the electronic device may be a mobile device or handheld device such that the display 110 is relatively small, thereby making it difficult for text to be legible when multiple windows are shown at the same time. In various embodiments, each window corresponds to one of the applications 111 running on the electronic device 105. Here, the applications 111 include a top window 115 and one or more previous windows 120.

In some embodiments, different windows correspond to different ones of the applications 111. In further embodiments, different windows correspond to different instances of a single application, such as different tabs/windows of a browser application, different documents open in a text editor, and the like. Thus, the top window 115 may belong to the same application or to a different application than the previous windows 120. Although a specific number of previous windows 120 are shown, the present disclosure is not limited to the depicted number. Indeed, the electronic device 105 may have more or fewer previous windows 120 than shown.

The top window 115 is the "topmost" window viewable on the display and may obscure at least part of each previous window 120. In the depicted example, the current application runs in fullscreen, such that only the top window 115 is visible to the user 125. Moreover, where split-screen mode is available, the top window 115 may be the active window where the user 125 is currently directing his/her attention, for example as evidenced by the last action of the user 125 being within the top window 115 or as determined by eye tracking data.

As depicted, the top window 115 includes an input field 130. The input field 130 is an area where the user 125 may input text. In some embodiments, when the user 125 selects the input field 130, or begins to input text into the top window 115, the electronic device 105 then captures data from the one or more previous windows 120 and presents this captured data within the top window 115, for example using the scraped data overlay 135 that is displayed within the top 115. While the depicted embodiment shows an overlay, in other embodiments the electronic device 105 may present a pop-up or other notification window, may present a preview window, may cause a portion of the top window 115 to be transparent whereby content (e.g., text or image data) of a previous window 120 may be viewed, may present the capture data as auto-fill, and the like.

As discussed in greater detail herein, the electronic device 105 captures or 'scrapes' data from the previous window(s) 120. For example, the electronic device 105 may scrape data that matches a format associated with the input field 130. In another example, the electronic device 105 may scrape data from an area that the user 125 was viewing prior to switching from the previous window 120 to the top window 115. Moreover, while the data entry matches the captures data, then electronic device 105 presents the scraped data within the top window 115, for example within the scraped data overlay 135. However, if the data entry differs from the scraped data, then the scraped data is not displayed. Similarly, after displaying the scraped data, if the data entry deviates from the scraped data (or if the user 125 stops entering data), then the electronic device 105 may remove the scraped data overlay 135 (and/or other instances of the scraped data being displayed in the top window 115). Other dismissal actions include looking away from the displayed text (e.g., away from the scraped data overlay 135).

In certain embodiments, the system 100 also includes a server 155 accessible via a network 150. The network 150 may include one or more data networks, including, but not limited to, telephone networks, local area networks, wireless networks, the Internet, and the like. In one embodiment, an application 111 running on the electronic device 105 may access the server 155 to retrieve content, such as image or text data, wherein this content may be made available to other applications running on the electronic device 105 as described herein.

Figure 2:
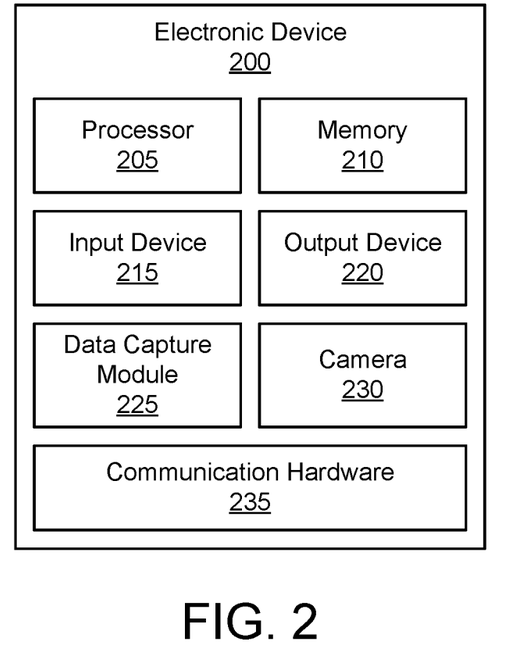
FIG. 2 is a schematic block diagram illustrating one embodiment of an apparatus for presenting data captured from a first user interface while the user is looking at a second user interface.

FIG. 2 depicts an electronic device 200 for presenting data captured from a first user interface while the user is looking at a second user interface, according to embodiments of the disclosure. The electronic device 200, may be one embodiment of the electronic device 105. Here, the electronic device 200 includes a processor 205, a memory 210, an input device 215, an output device 220, a data capture module 225, and communication hardware 235. In various embodiments, the electronic device 200 may optionally include camera system 230. The electronic device 200 may be one embodiment of the electronic device 105, discussed above. Here, the output device 220 may include one embodiment of the display 110, discussed above.

The electronic device 200 may include a body or an enclosure, with the components of the electronic device 200 being located within the enclosure. Although not depicted, the electronic device 200 may include a power source, such as a battery, power supply, or other source of electrical power. Moreover, the components of the electronic device 200 are communicatively coupled to each other, for example via a computer bus.

The processor 205, in one embodiment, may comprise any known controller capable of executing computer-readable instructions and/or capable of performing logical operations. For example, the processor 205 may be a microcontroller, a microprocessor, a central processing unit (CPU), a graphics processing unit (GPU), an auxiliary processing unit, a FPGA, or similar programmable controller. In some embodiments, the processor 205 executes instructions stored in the memory 210 to perform the methods and routines described herein. The processor 205 is communicatively coupled to the memory 210, the input device 215, the output device 220, the data capture module 225, the camera system 230, and the communication hardware 235.

The memory 210, in one embodiment, is a computer readable storage medium. In some embodiments, the memory 210 includes volatile computer storage media. For example, the memory 210 may include a random-access memory (RAM), including dynamic RAM (DRAM), synchronous dynamic RAM (SDRAM), and/or static RAM (SRAM). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media.

In some embodiments, the memory 210 stores data relating to presenting data captured from a first user interface while the user is looking at a second user interface. For example, the memory 210 may store scraped data, areas of interest, eye tracking data, pointers to current and previous windows, and the like. In some embodiments, the memory 210 also stores program code and related data, such as an operating system operating on the electronic device 200. In one embodiment, the data capture module 225 may be embodied in a software application (or set of software applications) stored in the memory 210 and operating on the electronic device 200 (e.g., running on the processor 205).

The input device 215, in one embodiment, may comprise any known computer input device including a touch panel, a button, a keyboard, a microphone, a camera, and the like. For example, the input device 215 may include a microphone or similar audio input device with which a user inputs sound or voice data (e.g., voice commands). In some embodiments, the input device 215 (or portion thereof) may be integrated with the output device 220, for example, as a touchscreen or similar touch-sensitive display. In some embodiments, the input device 215 comprises two or more different devices, such as a microphone and a touch panel.

The output device 220, in one embodiment, is configured to output visual, audible, and/or haptic signals. In some embodiments, the output device 220 includes an electronic display capable of outputting visual data to a user. For example, the output device 220 may include an LCD display, an LED display, an OLED display, a projector, or similar display device capable of outputting images, text, or the like to a user. In certain embodiments, the output device 220 includes one or more speakers for producing sound, such as an audible alert or notification. In some embodiments, the output device 220 includes one or more haptic devices for producing vibrations, motion, or other haptic output.

In some embodiments, all or portions of the output device 220 may be integrated with the input device 215. For example, the input device 215 and output device 220 may form a touchscreen or similar touch-sensitive display. As another example, the input device 215 and output device 220 may form a display that includes haptic response mechanisms. In other embodiments, the output device 220 may be located near the input device 215. For example, a microphone, speakers, and touchscreen may all be located on a common surface of the electronic device 200. The output device 220 may receive instructions and/or data for output from the processor 205 and/or the data capture module 225.

The data capture module 225, in one embodiment, is configured to acquire data from the first UI and present the acquired data in a second UI. In various embodiments, the data capture module 225 detects a switch from a first user interface ("UI") to a second UI and acquires data from the first UI. Referring to FIG. 1, this switch may be represented by a switch to the top window 115 (e.g., the second UI) from one of the previous windows 120 (e.g., the first UI). The data capture module 225 may also detect that a user (e.g., the user 125) is inputting data within the second user interface (e.g., data entry to the input field 130 within the top window 115) and present the acquired data in the second UI in response to detecting that the user is inputting data.

In certain embodiments, the data capture module 225 presents the acquired data by presenting the acquired data as an auto-fill suggestion. In other embodiments, the data capture module 225 presents the acquired data by overlaying the acquired data onto the second user interface. One example of overlaying the acquired data is the scraped data overlay 135. When overlaying the acquired data, the data capture module 225 may further remove the overlay containing acquired data (e.g., remove the scraped data overlay 135) in response to a dismissal action. In various embodiments, the dismissal action may be expiration of a predetermined amount of time, detecting that the user is not inputting the acquired data, and/or detecting that the user looks away from the overlay.

In certain embodiments, the data capture module 225 detects that the user is inputting data by determining that the user has selected an input field of the second user interface (e.g., selection of the input field 130) and/or by detecting that the user is typing. In certain embodiments, the data capture module 225 acquires data from the first user interface by performing an optical character recognition routine on content within the first user interface.

In some embodiments, the data capture module 225 determines an onscreen gaze location, e.g., from eye position data captured by the camera system 230. In one embodiment, the data capture module 225 operates on image data captured by the camera system 230 to determine the gaze location. In another embodiment, the camera system 230 may include a gaze tracking component that acquires the eye position data and the data capture module 225 determines an onscreen location that corresponds to the user's gaze. In certain embodiments, the data capture module 225 acquires data from the first user interface by identifying content from a subsection of the user interface corresponding to the onscreen gaze location and capturing text corresponding to the identified content.

In certain embodiments, the data capture module 225 acquires data from the first user interface by capturing data matching one or more predetermined formats. In certain embodiments, acquiring data from the first user interface includes the data capture module 225 storing the acquired data in a system-level digital clipboard.

The camera system 230, in one embodiment, is configured to capture image data, video data, and/or other visual data. In various embodiments, the camera system 230 captures image data of eye and/or face positions of the user in order to determine a gaze location of the user. As used herein, the "gaze location" refers to the spatial location corresponding to where the user is looking, e.g., the user's "gaze," particularly in relation to the display 110. For example, the gaze location may correspond to a particular user interface ("UI") or window, to a particular area or portion of the UI/window, or the like. In various embodiments, the camera system 230 may include one or more image processors. Here, an image processor may be configured to acquire eye tracking data and/or a gaze location from the captured image data. Moreover, the camera system 230 may comprise one or more image sensors, lenses, apertures, shutters, image processors, and the like. In certain embodiments, the camera system 230 comprises multiple digital cameras.

The communication hardware 235 may support wired or wireless communication between the electronic device 200 and another device or network, such as the network 140. The wireless connection may include a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

Figure 3:
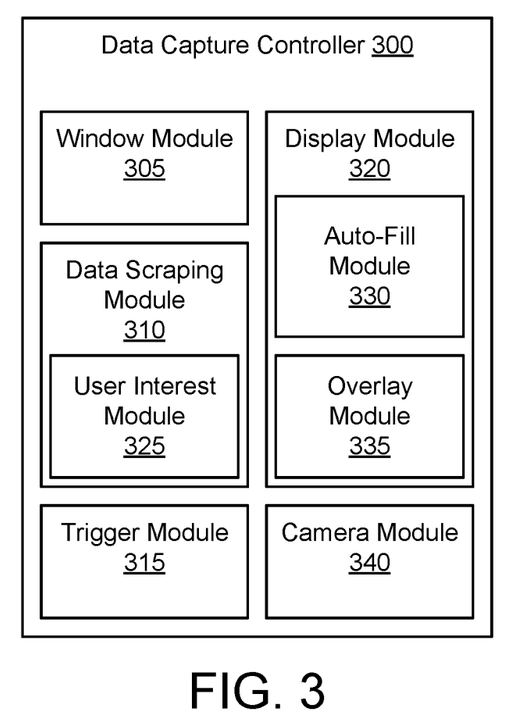
FIG. 3 is a schematic block diagram illustrating one embodiment of a data capture controller for presenting data acquired from a first user interface while the user is looking at a second user interface.

FIG. 3 depicts a data capture controller 300 for presenting data captured from a first user interface while the user is looking at a second user interface, according to embodiments of the disclosure. The data capture controller 300 may be one embodiment of the data capture module 225, discussed above. Further, the data capture controller 300 may be implemented on an electronic device, such as the electronic device 105 and/or electronic device 200.

As depicted, the data capture controller 300 includes a plurality of modules. Specifically, the data capture controller 300 may include a window module 305, a data scraping module 310, a trigger module 315, and a display module 320. In certain embodiments, the data capture controller 300 may also include one or more of: a user interest module 325, an auto-fill module 330, an overlay module 335, and a camera module 340. The modules 305-340 may be implemented as hardware, software, or a combination of hardware and software.

The window module 305, in one embodiment, is configured to identify a current window and a switch to the current window from a previous window. Note that the window may be an instance of an application running on the electronic device 105. In various embodiments, a single application may have multiple windows open, corresponding to multiple instances of the application running on the device.

The data scraping module 310, in one embodiment, is configured to capture data from a previous window (e.g., from a first UI). In certain embodiments, the data scraping module 310 captures the data by storing it to a system-level clipboard. The captured data may be text or image data. In certain embodiments, the data scraping module 310 used one or more optical character recognition ("OCR") routines to extract text from image content. In certain embodiments, the data scraping module 310 captures the data by requesting the data from application to which the previous window corresponds via a public API.

In various embodiments, the data scraping module 310 captures data matching one or more predetermined formats. For example, the one or more predetermined formats may include names, email addresses, phone numbers, web addresses (e.g., Uniform Resource Locator ("URL"), and/or Uniform Resource Identifier ("URI")), usernames, domain names, physical addresses, coordinates, text, and the like. In some embodiments, the data scraping module 310 captures data matching a format associated with an input field of the current window.

In one embodiment, the data scraping module 310 captures a "screenshot" of the previous window, where the current window covers the previous window such that the captured data cannot be seen due to the presence of the current window. Thus, the "screenshot" may comprise content (e.g., images and/or text) that is covered by the current window but would be seen were the previous window not covered by the current window. In certain embodiments, the previous window may be minimized, wherein the data scraping module 310 captures data that would be seen were the previous window not minimized.

The user interest module 325, in one embodiment, is configured to identify an area of user interest for the previous window. In one embodiment, the user interest module 325 receives gaze location information from the camera module 340, specifically one or more gaze locations from a predetermined amount of time prior to the user switching away from the previous window. From the gaze location(s), the user interest module 325 may determine an onscreen location and an area of the previous window corresponding to the onscreen location. The data scraping module 310 may then capture data from a subsection of the previous window corresponding to the onscreen location. While depicted as a component of the data scraping module 310, in other embodiments the user interest module 325 may be an independent module within the data capture controller 300.

The trigger module 315, in one embodiment, is configured to trigger the capture and/or display of data from the previous window, e.g., in response to detecting a predetermined trigger. In various embodiments, the trigger module 315 instructs the data scraping module 310 to capture data in response to the trigger. In some embodiments, the trigger module 315 instructs the display module 320 to display the captured data in response to the trigger.

In some embodiments, the trigger is the user switching windows. For example, the trigger module 315 may cause the data scraping module 310 to capture the data in response to the user switching from the previous window to the current window. In various embodiments, the trigger may be detecting an input field in the current window, the user selecting an input field, the user beginning to enter (e.g., type) input data, or the like. For example, the trigger module 315 may cause the data scraping module 310 to capture and/or display the data in response to the user switching from the previous window to the current window. In certain embodiments, the trigger may be an action performed by the user, such as a spoken command (e.g., phrase), a gesture, a click of an icon, or the like.

The display module 320, in one embodiment, is configured to present the captured data in the current window. In various embodiments, the display module 320 presents the captured data in response to detecting that the user is inputting data. In certain embodiments, the trigger module 315 may detect that the user is inputting data and signal the display module 320 to present the captured data. In some embodiments, the display module 320 presents the captured data in response to the user selecting an input field of the current window or performing a click action (e.g., finger tap, left-click, right-click, etc.) on the input field.

In various embodiments, the display module 320 may be configured with an auto-fill module 330 and/or an overlay module 335. Where so configured, the display module 320 may include an auto-fill module 330 for presenting the captured data as an auto-fill suggestion. The auto-fill module 330, in one embodiment, is configured to present the captured data as an auto-fill suggestion. In one embodiment, after the user types a predetermined number of matching characters (e.g., two or three), the auto-fill module 330 inserts the captured data into the active input field. While depicted as a component of the display module 320, in other embodiments the auto-fill module 330 may be an independent module within the data capture controller 300.

Where so configured, the display module 320 may include an overlay module 335 for presenting the captured data by overlaying the data onto the current window. The overlay module 335, in one embodiment, is configured to present the captured data (captured from the previous window) atop content of the current window. In various embodiments, the overlay module 335 presents the overlay near an active input field of the current window, such as the input field 130.

In certain embodiments, the overlay module 335 presents an overlay window that is see-through (e.g., transparent and/or translucent). In certain embodiments, the overlay module 335 presents a "preview" window containing the captured data, for example in miniature form. In one embodiment, the preview window contains only a portion of the previous window. In certain embodiments, the overlay is a pop-up window having a "close" button. Thus, the overlay module 335 may remove the overlay in response to the user clicking the "close" button or performing another dismissal action, as discussed in further detail below.

In certain embodiments, the overlay module 335 may fade out the overlay as the user types in text from the overlay. For example, if the overlay presents a phone number captured from the previous window, that the overlay module 335 (after displaying the phone number in an overlay) may fade out digits of the phone number as the user types them in to the current window.

In some embodiments, the overlay module 335 may remove the overlay if the user stops typing data that matches the captured data. Similarly, the overlay module 335 may remove the overlay if the user begins to enter data that does not match the captured data. In other embodiments, if the user begins to enter data that deviates from the captured data, then the overlay module 335 may highlight the mismatched text/content or perform some other distinguishing visual indication within the overlay to warn of the potentially erroneous input.

In various embodiments, the overlay module 335 remove the overlay in response to a dismissal action. One example of the dismissal action is the user clicking on a close button within the overlay. Other examples of dismissal actions include, but are not limited to, dragging the overlay away from the input field, swiping the overlay, looking away from the overlay (e.g., for at least a predetermined amount of time), looking away from both the overlay and the input field for at least predetermined amount of time, speaking a dismissal phrase. Yet another example of a dismissal action is the expiration of a timer. For example, a timer counting a preset amount of time may begin when the overlay is resented, wherein the overlay module 335 remove the overlay in response to expiration of the timer. While depicted as a component of the display module 320, in other embodiments the overlay module 335 may be an independent module within the data capture controller 300.

The camera module 340, in one embodiment, is configured to control a digital camera, for example embodied in the camera system 230, to track eye position, face position, or other relevant data for tracking a user's gaze. The camera module 340, in some embodiments, calculates a gaze location with respect to the display and/or a UI presented on the display. Accordingly, the gaze location may be used to identify an area of interest within the previous window, as discussed above.

Figure 4:
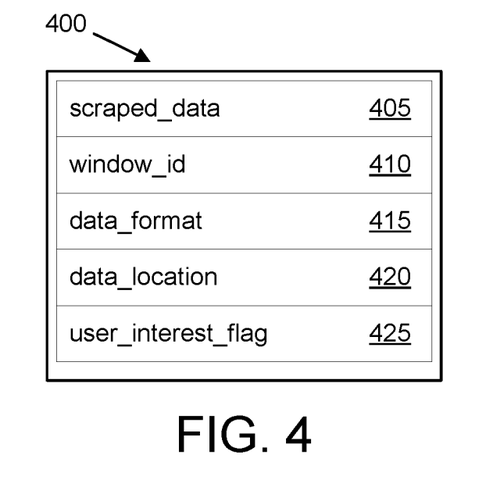
FIG. 4 is a block diagram in the street in one embodiment of a data structure used for presenting data captured from a first user interface while the user is looking at a second user interface.

FIG. 4 depicts a data structure 400 for presenting data captured from a first user interface while the user is looking at a second user interface, according to embodiments of the disclosure. In various embodiments, the data structure 400 may be created by an electronic device, such as the electronic device 105 and/or electronic device 200, by the data capture module 225, and/or by the data capture controller 300. As depicted, the data structure 400 includes various components including scraped data 405 and one or more metadata fields such as a window identification field 410, a data format field 415, a data location field 420, and/or a user interest flag 425.

The scraped data 405 contains the data captured by the electronic device, data capture module, and/or data capture controller. As discussed above, this data may be captured from a previous window in response to various trigger actions. The window identification field 410 may be used to indicate the previous window from which the scraped data 405 was captured. In one example, the window identification field includes a process identifier corresponding to the window, application, and/or application instance from which the scraped data 405 was acquired. In another example, the window identification field may include a pointer indicating which window from the plurality of opened and/or active windows the captured data 405 was acquired from.

In various embodiments, the data format field 415 indicates a type or format of the captured data 405. Examples of data formats include names, email addresses, phone numbers, web addresses (e.g., Uniform Resource Locator ("URL"), and/or Uniform Resource Identifier ("URI")), usernames, domain names, physical addresses, coordinates, text, and the like. In various embodiments, the data location field 420 may be used to indicate an area of the captured data within the previous window from which the captured data was acquired. The data location may thus be used with eye tracking data to identify an area of user interest in the previous window. In other embodiments, the data location field 420 may be used to indicate where the captured data is stored, for example a memory address, a specific system-level clipboard, a system file, and the like. In various embodiments, the user interest flag 45 is used to signal whether the user showed interest in the captured data 405 prior to switching away from the previous window from which the captured data 405 was acquired. User interest may be determined using eye tracking data, verbal cues, clicks, highlights or other selection options, and the like.

FIGS. 5A-5D depict a first example 500 of presenting data captured from a first user interface while the user is looking at a second user interface, according to embodiments of the disclosure. In the first example 500, a mobile device 505 captures data from a first window 510 for display within a second window 520 after the user switches from the first window 510 to the second window 520. The mobile device 505 includes a display and may be one embodiment of the electronic device 105, and/or the electronic device 200. Additionally, the mobile device 505 may include an embodiment of the data capture module 225 and/or the data capture controller 300.

Figure 5A:
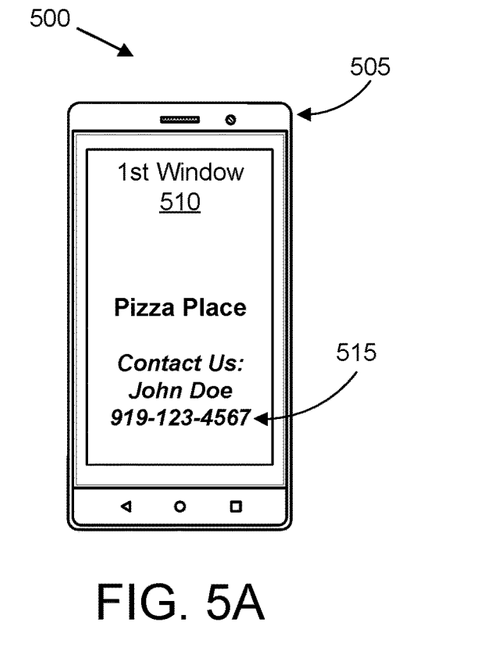
FIG. 5A is a diagram illustrating one embodiment of a mobile device presenting data captured from a first user interface after the user switches to a second user interface.

FIG. 5A shows the mobile device 505 presenting the first window 510 to the user. In the depicted example, the content displayed in the first window 510 includes a phone number 515. Here, the first window 510 may be a webpage displayed by a web browser, a contact entry from a contacts application, a virtual business card, or the like. In various embodiments, the mobile device 505 captures text data from the first window 510 in response to the user switching away from the first window 510.

Figure 5B:
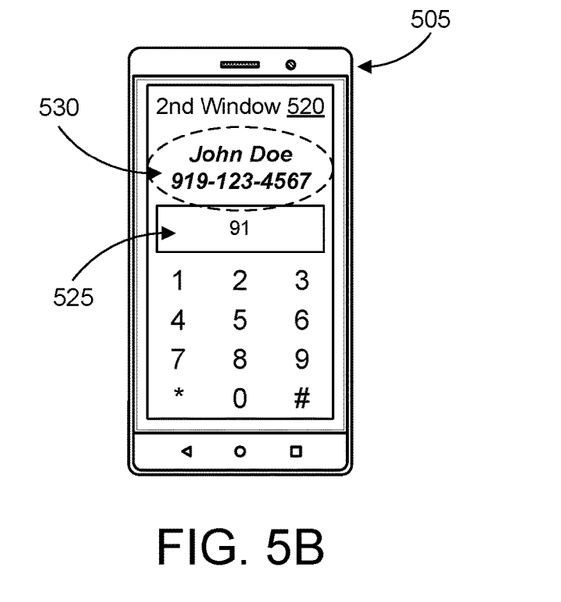
FIG. 5B is a diagram illustrating the mobile device of FIG. 5A where the captured data is presented in an overly.

FIG. 5B shows one embodiment of the mobile device 505 after the user switches from the first window 510 to the second window 520. The second window 520 includes an input field 525 where user may enter text, such as a phone number. Here, the second window 520 may belong to a telephone application, a text messaging application, or the like.

In the example of FIG. 5B, the mobile device 505 presents the data captured from the first window 510 as an overlay 530. In one embodiment, the mobile device 505 presents the overlay 530 in response to determining that the first window 510 includes a phone number and also that a phone number may be entered into the second window 520. For example, the application corresponding to the second window 520 may be associated with a set of data formats, such as a phone number. In another embodiment, the mobile device 505 detects that the user is beginning to enter a phone number whose first digits match the phone number 515 captured from the first window 510 and then presents the overlay 530 in response.

Figure 5C:
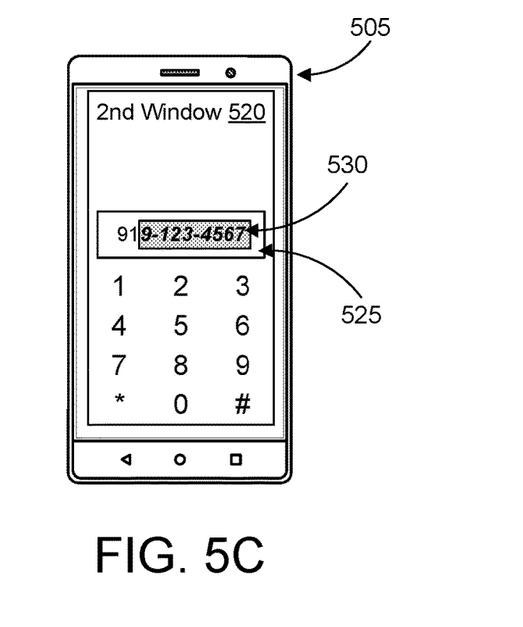
FIG. 5C is a diagram illustrating the mobile device of FIG. 5A where the captured data is presented as an auto-fill suggestion.

FIG. 5B shows another embodiment the mobile device 505 after the user switches from the first window 510 to the second window 520. In the example of FIG. 5C, the mobile device 505 presents the data captured from the first window 510 as an auto-fill suggestion 535. In one embodiment, the mobile device 505 detects that the user is beginning to enter a phone number whose first digits match the phone number 515 captured from the first window 510 and then presents the auto-fill suggestion 535 in response.

Figure 5D:
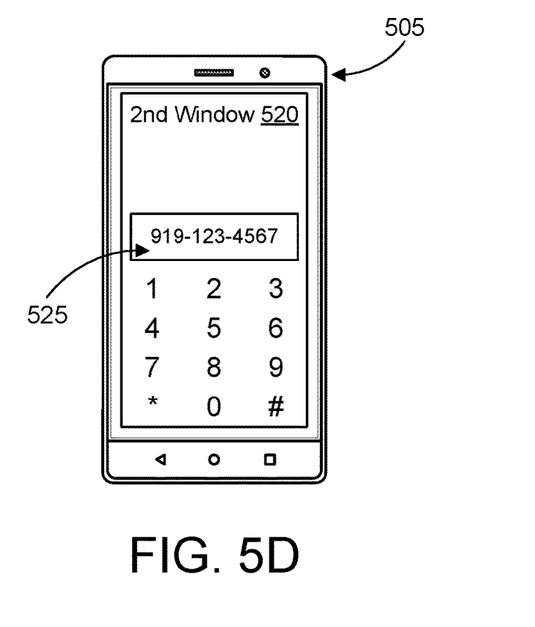
FIG. 5D is a diagram illustrating the mobile device of FIG. 5A after the captured data is input into the second user interface.

FIG. 5D shows the mobile device 505 having removed the captured data (e.g., the phone number "scraped" from the first window 510) after presenting it in the second window 520. In one embodiment, the mobile device 505 removes the phone number after the user finishes typing it in. For example, digits of the phone number may fade away as the user types them in. In another embodiment, the mobile device 505 removes the phone number in response to a dismissal action, such as those described above. In yet another embodiment, the mobile device 505 receives an indication from the user to insert the captured phone number into the input field 525, does so, and then removes the overlay 530 or auto-fill suggestion 535.

FIGS. 6A-6D depict a second example 600 of presenting data captured from a first user interface while the user is looking at a second user interface, according to embodiments of the disclosure. In the second example 600, a mobile device 605 captures data from a first window 615 for display within a second window 625 after the user switches from the first window 615 to the second window 625. The mobile device 605 includes a display and a camera 610. Here, the camera 610 faces the user and captures image data used to determine the user's gaze location (e.g., a position on the display that the user is looking at). The mobile device 605 may be one embodiment of the electronic device 105, and/or the electronic device 200. Additionally, the mobile device 605 may include an embodiment of the data capture module 225 and/or the data capture controller 300.

Figure 6A:
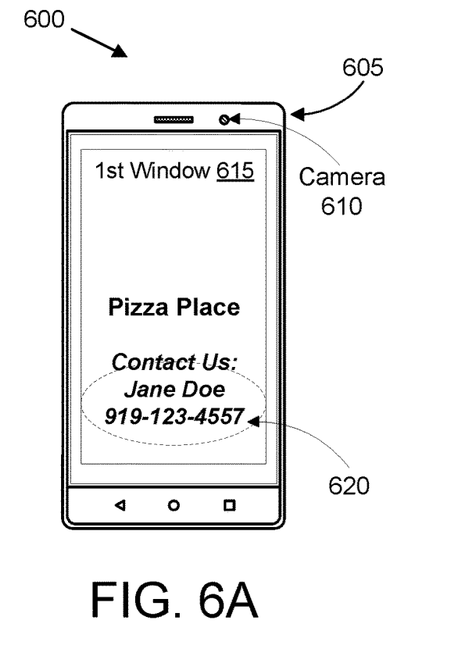
FIG. 6A is a diagram illustrating another embodiment of a mobile device presenting data captured from a first user interface after the user switches to a second user interface.

FIG. 6A shows the mobile device 605 presenting the first window 615 to the user. Here, the mobile device 605 determines an area of interest 620, e.g., based on the image data captured by the camera 610. In response to detecting the user interest, the mobile device 605 scrapes data from the area of interest 620. In the depicted example, the content displayed in the area of interest 620 includes a phone number. In one embodiment, optical character recognition routines may be used to extract text data from an image displayed in the area of interest 620. In certain embodiments, scraping data from the area of interest 620 occurs in response to the user switching away from the first window 615. The first window 615 may be a webpage displayed by a web browser, a contact entry from a contacts application, a virtual business card, or the like.

Figure 6B:
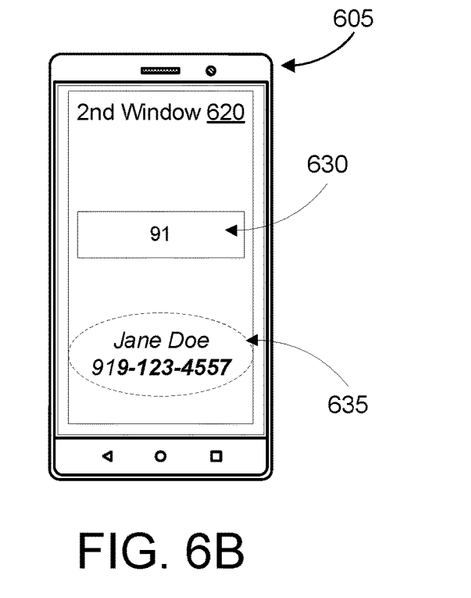
FIG. 6B is a diagram illustrating the mobile device of FIG. 6A at a second point time.

FIG. 6B shows the shows the mobile device 605 after the user switches from the first window 615 to the second window 625. The second window 625 includes an input field 630 where user may enter text, such as a phone number. Here, the second window 625 may belong to a telephone application, a text messaging application, or the like.

In the depicted embodiment, the user has entered text into the input field 630 and the mobile device 605 determines that the text entry matches the first digits of a phone number captured from the area of interest 620. In response to this determination, the mobile device 605 presents an overlay 635 containing the scraped data. In one embodiment, the overlay includes a screen capture of the area of interest 620. In another embodiment, the overlay includes text data extracted from the area of interest 620. In certain embodiments, the mobile device 605 may indicate the next digits of the phone number, for example by playing an emphasis to the text in the overlay 635 corresponding to the digits not yet entered.

Figure 6C:
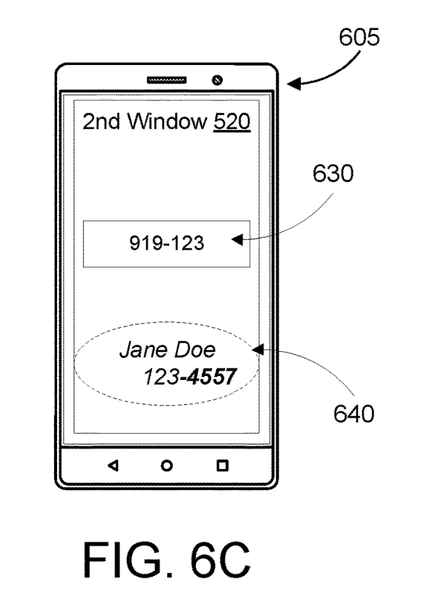
FIG. 6C is a diagram illustrating the mobile device of FIG. 6A at a third point in time.

FIG. 6C shows the mobile device 605 after the user enters additional digits of the phone number into the input field 630. In certain embodiments, the mobile device 605 modifies the overlay as the user continues to enter text matching the captured data to fade out already entered characters. The modified overlay is depicted at 640.

Figure 6D:
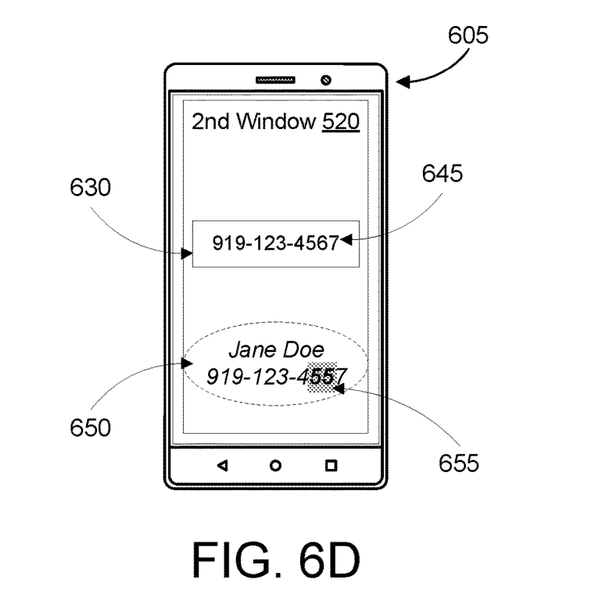
FIG. 6D is a diagram illustrating the mobile device of FIG. 6A at a fourth point in time.

FIG. 6D shows the mobile device 605 after the user completes entry of a phone number. Here, the mobile device 605 determines that the phone number 645 entered into the input field 630 does not match the phone number captured from the area of interest 620. In response to this determination, the mobile device 605 may present the phone number captured from the area of interest 620, depicted at 650, and highlight 655 be potentially mistyped digit(s). In this way, the mobile device 605 notifies the user of the potential data entry error.

Figure 7:
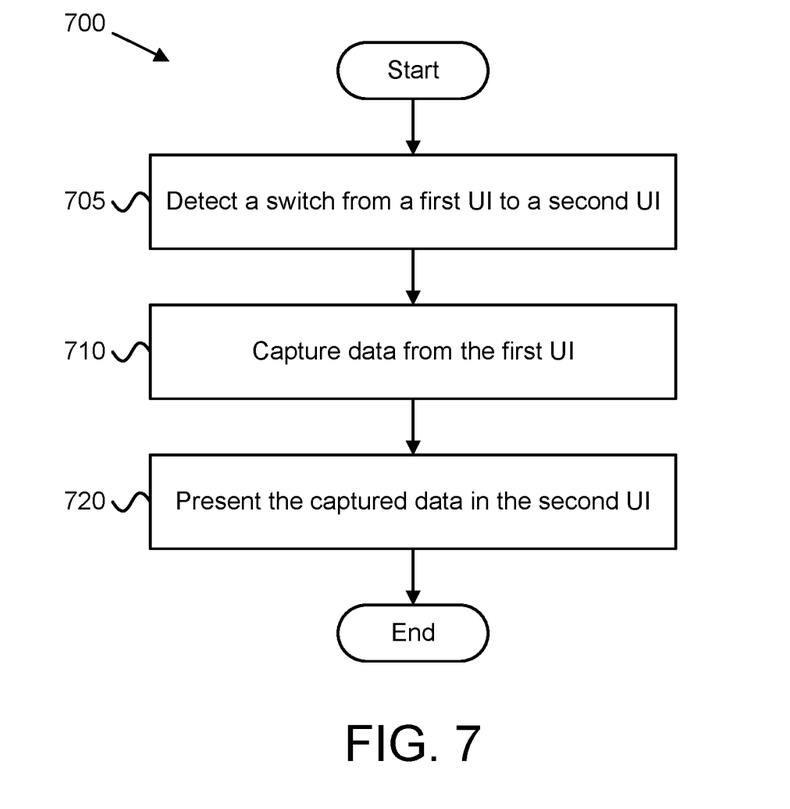
FIG. 7 is a flowchart diagram illustrating one embodiment of a method for presenting data captured from a first user interface while the user is looking at a second user interface.

FIG. 7 depicts a method 700 for presenting data captured from a first user interface while the user is looking at a second user interface, according to embodiments of the disclosure. In some embodiments, the method 700 is performed by the electronic device 105, the electronic device 200, the data capture module 225, and/or the data capture controller 300, described above. In some embodiments, the method 700 is performed by a processor, such as a microcontroller, a microprocessor, a central processing unit (CPU), a graphics processing unit (GPU), an auxiliary processing unit, a FPGA, or the like.

The method 700 begins and detects 705 a switch from a first UI to a second UI. In one embodiment, the first UI and second UI belong to different applications running on the user device 105. In another embodiment, the first UI and second UI belong to different instances of the same application. For example, the first and second UIs may be different active tabs of a (e.g., web) browser.

In certain embodiments, detecting 705 the switch from the first UI to the second UI includes tracking active applications/windows and detecting a change in the top application/window. In other embodiments, detecting 705 the switch may include detecting a specific keystroke (or combination of keystrokes), detecting selection of a specific UI element, or the like.

The method 700 includes capturing 710 data from the first UI. In one embodiment, data with predetermined formats is captured from the first UI. In certain embodiments, capturing 710 data from the first UI includes using an optical character recognition routine on content within the first UI to extract the data. In some embodiments, capturing 710 data from the first UI includes identifying an area of interest wherein the captured data is acquired only from the area of interest.

The method 700 includes presenting 715 the captured data within the second UI. In various embodiments, presenting 715 the captured data occurs in response to detecting that the user is inputting data. In some embodiments, detecting that the user is inputting data includes determining that the user selected input field of the second UI. In some embodiments, detecting that the users inputting data includes detecting that the user is typing while the second UI is active (e.g., the topmost window).

In one embodiment, presenting 715 the captured data includes presenting the captured data as an auto-field suggestion. In another embodiment, presenting 715 the captured data includes overlaying the captured data onto the second UI. The method 700 ends.

Figure 8:
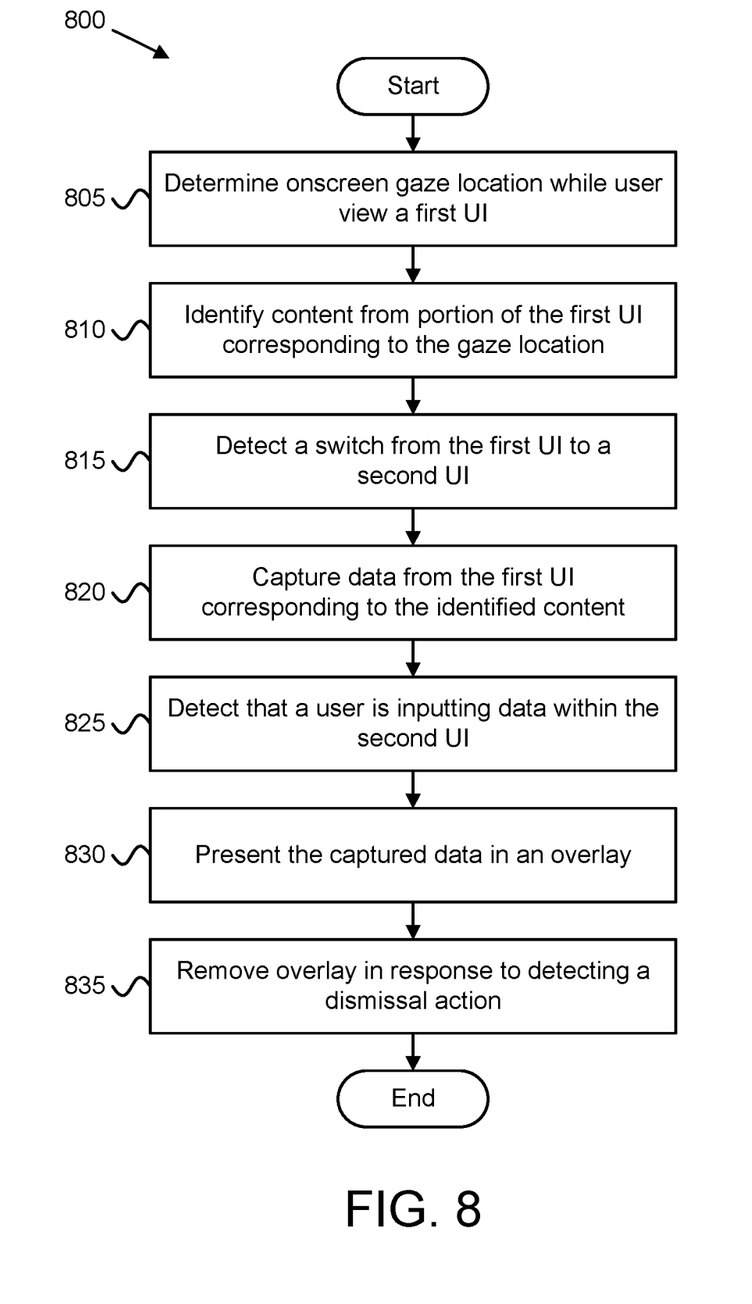
FIG. 8 is a flowchart diagram illustrating another embodiment of a method for presenting data captured from a first user interface while the user is looking at a second user interface.

FIG. 8 depicts a method 800 for presenting data captured from a first user interface while the user is looking at a second user interface, according to embodiments of the disclosure. In some embodiments, the method 800 is performed by the electronic device 105, the electronic device 200, the data capture module 225, and/or the data capture controller 300, described above. In some embodiments, the method 800 is performed by a processor, such as a microcontroller, a microprocessor, a central processing unit (CPU), a graphics processing unit (GPU), an auxiliary processing unit, a FPGA, or the like.

The method 800 begins and determines 805 on-screen gaze location while the user views a first UI. For example, the electronic device 105 may include in camera used to capture eye position data. From the eye position data, the electronic device 105 may determine 805 the on-screen gaze location. The method 800 includes identifying 810 content from the portion of the first UI corresponding to the gaze location.

The method 800 includes detecting 815 a switch from the first UI to a second UI. In one embodiment, the first UI and second UI belong to different applications running on the user device 105. In another embodiment, the first UI and second UI belong to different instances of the same application. For example, the first and second UIs may be different active tabs of a (e.g., web) browser.

In certain embodiments, detecting 815 the switch from the first UI to the second UI includes tracking active applications/windows and detecting a change in the top application/window. In other embodiments, detecting 815 the switch may include detecting a specific keystroke (or combination of keystrokes), detecting selection of a specific UI element, or the like.

The method 800 includes capturing 820 data from the first UI corresponding to the identified content. In one embodiment, only data with predetermined formats is captured from the first UI. In certain embodiments, capturing 820 data from the first UI includes using an optical character recognition routine on the identified content to extract the data.

The method 800 includes detecting 825 that the user is inputting data within the second UI. In some embodiments, detecting 825 that the user is inputting data includes determining that the user selected input field of the second UI. In some embodiments, detecting 825 that the users inputting data includes detecting that the user is typing while the second UI is active (e.g., the topmost window).

The method 800 includes presenting 830 the captured data in an overlay. The method 800 includes removing 835 the overlay in response to detecting a dismissal action. In various embodiments, the dismissal action may be expiration of a predetermined amount of time, detection that the user is not inputting the captured data, detection that the user is looking away from the overlay, and the like. The method 800 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising: a display; a camera; a processor; and a memory that stores code executable by the processor to: track an eye position of a user on a first user interface using the camera; determine an onscreen gaze location on the first user interface from eye position data; detect a switch from a first user interface to a second user interface; capture data from the first user interface, the captured data comprising content identified from a subsection of the user interface corresponding to the onscreen gaze location and capturing text corresponding to the identified content; present the captured data in the second user interface in response to detecting that the user is inputting data in the second user interface; and modify the presented captured data as the user inputs data that matches the captured data to graphically indicate data of the captured data that is already entered.

2. The apparatus of claim 1, wherein presenting the captured data comprises presenting the captured data as an auto-fill suggestion.

3. The apparatus of claim 1, wherein presenting the captured data comprises overlaying the captured data onto the second user interface.

4. The apparatus of claim 3, wherein the processor further removes the overlay containing the captured data in response to a dismissal action, the dismissal action being one or more of: expiration of a predetermined amount of time, detecting that the user is not inputting the captured data, and detecting that the user looks away from the overlay.

5. The apparatus of claim 1, wherein detecting that the user is inputting data comprises one or more of: determining that the user has selected an input field of the second user interface, and detecting that the user is typing.

6. The apparatus of claim 1, wherein capturing data from the first user interface comprises performing an optical character recognition routine on content within the first user interface.

7. The apparatus of claim 1, wherein capturing data from the first user interface comprises capturing data matching one or more predetermined formats.

8. The apparatus of claim 1, wherein capturing data from the first user interface comprises storing the captured data in a system-level digital clipboard.

9. The apparatus of claim 1, wherein modifying the presented captured data comprises graphically fading away one or more characters of the captured data as the user inputs data that matches the captured data.

10. A method comprising: tracking an eye position of a user on a first user interface using a camera; determining an onscreen gaze location on the first user interface from eye position data; detecting, by use of a processor, a switch from a first user interface to a second user interface; capturing data from the first user interface, the captured data comprising content identified from a subsection of the user interface corresponding to the onscreen gaze location and capturing text corresponding to the identified content; presenting the captured data in the second user interface in response to detecting that the user is inputting data in the second user interface; and modifying the presented captured data as the user inputs data that matches the captured data to graphically indicate data of the captured data that is already entered.

11. The method of claim 10, wherein presenting the captured data comprises presenting the captured data as an auto-fill suggestion.

12. The method of claim 10, wherein presenting the captured data comprises overlaying the captured data onto the second user interface.

13. The method of claim 12, further comprising: removing the overlay containing the captured data in response to a dismissal action, wherein the dismissal action is one or more of: expiration of a predetermined amount of time, detecting that the user is not inputting the captured data, and detecting that the user looks away from the overlay.

14. The method of claim 10, wherein detecting that the user is inputting data comprises one or more of: determining that the user has selected an input field of the second user interface, and detecting that the user is typing.

15. The method of claim 10, wherein capturing data from the first user interface comprises performing an optical character recognition routine on content within the first user interface.

16. The method of claim 10, wherein capturing data from the first user interface comprises capturing data matching one or more predetermined formats.

17. The method of claim 10, wherein modifying the presented captured data comprises graphically fading away one or more characters of the captured data as the user inputs data that matches the captured data.

18. A program product comprising a non-transitory computer readable storage medium that stores code executable by a processor, the executable code comprising code to: track an eye position of a user on a first user interface using a camera; determine an onscreen gaze location on the first user interface from eye position data; detect a switch from a first user interface to a second user interface; capture data from the first user interface, the captured data comprising content identified from a subsection of the user interface corresponding to the onscreen gaze location and capturing text corresponding to the identified content; detect that a user is inputting data within the second user interface; present the captured data in the second user interface in response to detecting that the user is inputting data in the second user interface; and modify the presented captured data as the user inputs data that matches the captured data to graphically indicate data of the captured data that is already entered.

19. The program product of claim 18, wherein detecting that the user is inputting data comprises one or more of: determining that the user has selected an input field of the second user interface, and detecting that the user is typing.

20. The program product of claim 18, wherein capturing data from the first user interface comprises capturing data matching one or more predetermined formats.

* * * * *